INVENTOR:
Rolf Neubert

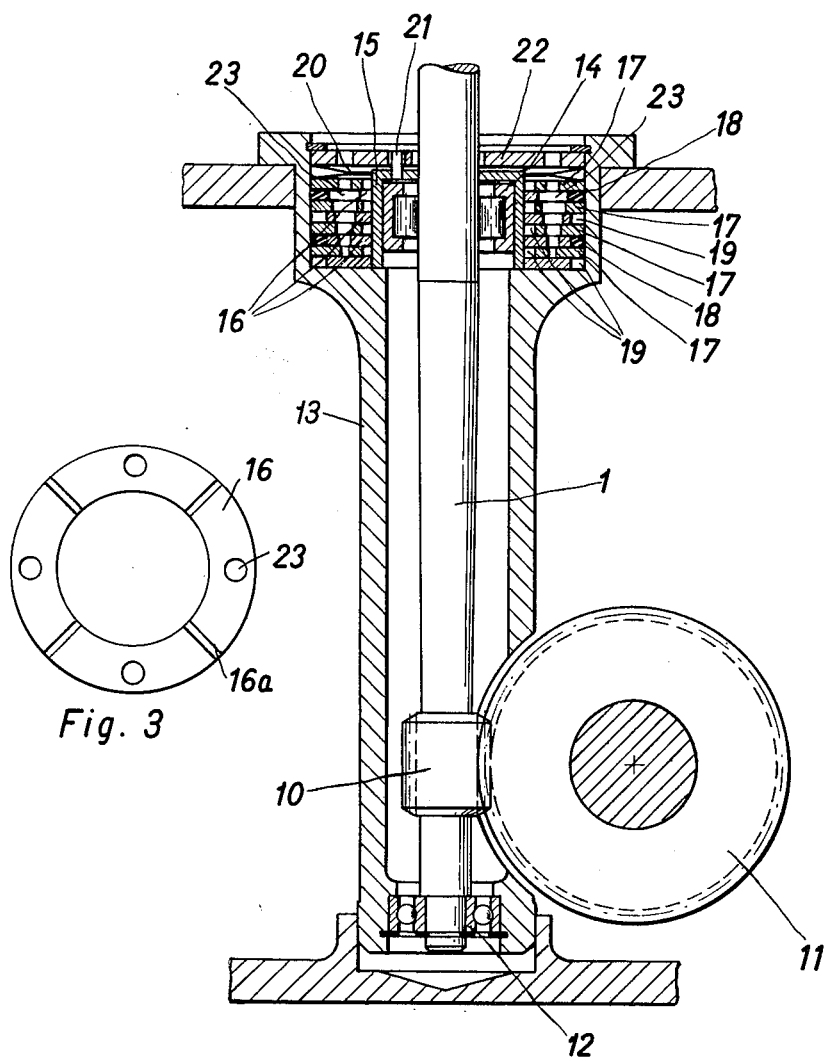

Feb. 1, 1966    R. NEUBERT    3,232,684
SPINNING OR YARN SPINDLE

Filed Oct. 23, 1963    5 Sheets-Sheet 3

INVENTOR:
Rolf Neubert
By

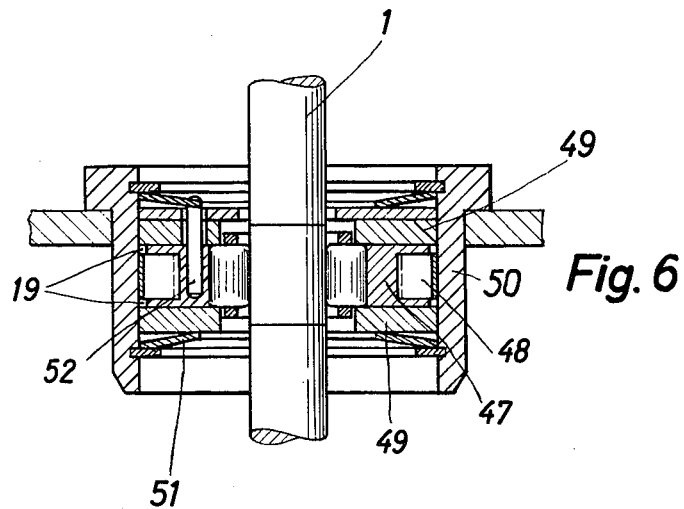
Fig. 6
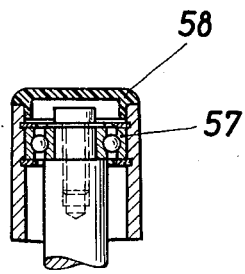
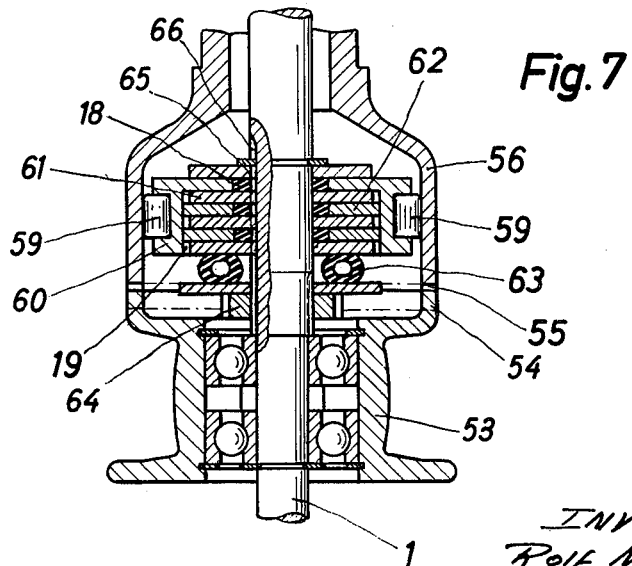
Fig. 7
INVENTOR:
Rolf Neubert 3,232,684
SPINNING OR YARN SPINDLE
Rolf Neubert, Bremen-Aumund, Germany, assignor to Spinnbau G.m.b.H., Bremen-Farge, Germany
Filed Oct. 23, 1963, Ser. No. 318,301
Claims priority, application Germany, Oct. 26, 1962, S 82,208
10 Claims. (Cl. 308—152)

The invention relates to spinning or yarn spindles equipped with damping means to compensate for imbalances and oscillations.

Spinning or yarn spindles driven by belts or friction wheels are known, wherein the spindles are damped by displacing fluids, such as oil, at the bottom bearing thereof. For optimum running conditions, an oil must be used for lubrication and a different liquid for damping. This proposal is known but is complex to carry out, since the sealing-off of the two liquids from one another presents problems; in addition, the bearings of such spindles are more difficult and more expensive to service.

It is also known to use damping means in hermetically sealed chambers. This presupposes that the damping means will not change their properties during the life of the spindle. If it has to be changed, even for varying the damping properties, then it is difficult to reseal it hermetically and to determine what quantity the chambers should contain.

Some spinning or yarn spindles which are driven by gears are designed so that damping takes place at the collar bearing by means of a rubber ring. Rubber alone is insufficient for damping a spindle because it is elastic, i.e., it springs back when radially displaced during rotation of the spindle. This leads to impacts and oscillations which have a very unfavourable effect on the operation of the spindle. Even if the rubber has a very low Shore hardness, giving it maximum internal friction and thus optimum damping properties, rocking is inevitable.

Another gear-driven spindle is designed so that the shank of the spindle is surrounded by the toothed driving member. The two parts are mounted separately. This spindle is also damped by displacement of oil, as already described. Here, in addition to providing a good damping action for the spindle and having good lubricating properties for the bearings, the damping medium is required to provide adequate lubrication for the gears; that is to say, an optimum solution for three different requirements is obtainable only with difficulty.

Another disadvantage of known damping means is that a given minimum amount of oil must be provided, i.e., a certain oil level, which is always considerably higher than would be required for lubricating the bearings. This leads to increased oil consumption and to a rise in the power input of the spindle, the friction between the shank of the spindle and the oil increasing as the level of the oil at the shank is increased.

In addition to oil damping means, other oil-damped spindles have a so-called brake sleeve for centering and stabilising the spindle. The sleeve co-operates with a braking ring, the sleeve and ring being provided with an interfitting cone and being pressed onto one another by spring force, under their own weight or under the weight of the spindle. If the spindle shows a tendency to greater lateral deflection, it must overcome the friction between the braking sleeve and the ring. The following may then happen: the braking sleeve and braking ring are either relatively displaced with their axes parallel so that there is line contact between them, or they come into contact over an approximately elliptical annular area and a part of both of them has to be tilted. Linear contact results in movement of the line of contact over the whole periphery of the conical surface, which makes centering of the spindle sluggish and non-continuous. Tilting of the braking sleeve and/or braking ring also leads to non-continuous centering and abnormally large deflection of the spindle and also to harmful canting of the two opposing slide faces of the spindle shank and bearing.

The invention aims to avoid these disadvantages and to provide damping means which can be widely adapted to suit the various operation conditions.

According to the invention the damping means are in the form of friction members, for example annular discs, which are pressed axially against one another and are movable radially relatively to one another. The axial pressure on these friction members is produced by resilient means or even by the inherent weight of the spindle and cop, so that any radial deflection of the spindle meets with frictional resistance. This effects good damping without relying on a certain oil level or a certain quantity of another deformable damping element. Only a very small amount of lubricant is needed for lubricating the contact faces of the friction discs.

Tests have shown that, for purposes of obtaining uniform damping action and making the lubricant adhere between the contact faces of the friction discs, it is particularly favourable for the difference between the external and internal diameters of the friction discs to be at least three quarters of the diameter of the spindle shank.

The friction discs may be made of abrasion-resistant plastics material, or discs made of friction or brake lining or plastics material may be placed between the metal friction discs, so that lubrication can be dispensed with altogether; the contact surfaces could also be coated with molybdenum disulphide.

If oil is used for a given spindle drive or a spindle bearing, it may be employed to provide additional damping in oil gaps if the friction discs are made extra thick.

The damping effect may be varied by a simple variation in the force pressing the friction discs together.

As a particular advantage of the invention, it may be said quite generally that no uninterrupted level or circulation of lubricant is essential. This makes it possible for spinning and yarn spindles to be equipped with "life-time" damping means as well as the "life-time" bearings already in use.

In accordance with the invention, the spindle bearings and thus the spindle are centered separately from the damping elements by resilient elements made of metal, rubber or plastics. This arrangement is particularly advantageous, since the elments for damping and centering the spindle can be independently adapted to one another. Resilient rings made of rubber or plastics and provided with external and internal toothing, where an internal tooth is opposite an external gap or vice versa, have proved particularly advantageous for centering the spindle. In this way relatively large Shore hardnesses, i.e., Shore hardnesses remaining constant for a long time, can be used without the centering effect becoming too strong and without provoking additional oscillations because the tooth will bend when loaded.

The invention also purposes the use of an annular spiral ring or a corrugated leaf spring bent into ring-shape. These embodiments have the advantage of making the centering process particularly gentle and preventing any variation in the elastic behaviour of the centering elements.

The damping means according to the invention offer particular advantages when use for a rotary spindle designed, according to the invention, so that the drive whorl or another drive element, such as a gear wheel moves on the shank separately from the actual upper portion of the spindle and is connected to a toothing having a large amount of clearance. The upper portion of the spindle moves in bearings which co-operate at the top and/or bottom with friction damping means. Thus, by means of the above construction and by life-long lubrication of the damping means and bearings, it is possible to make the upper portion of the spindle free from the drive.

The spindle-damping means according to the invention may advantageously be used for spindles driven by helical gears. Because of the good lubrication, the drive members, helical gears and coupling are located at or near the preferably low oil level in the bottom of the spindle beam. To keep the sag of the drive gears as constant as possible, the lower bearing must be tightly clamped at the bottom near the point where the teeth engage. This makes it necessary for the damping means to be mounted near the upper bearing, but oil-damping cannot be used there because of the sealing problem. The damping action produced by friction between solid members may very advantageously be used in this place, since only the oil vapour, which is always present, is used for lubrication.

FIGURE 2 is a view partly in section, showing a spindle driven by gears;

FIGURE 3 is an elevational view showing a friction disc pertaining to the FIGURE 2 modification;

FIGURE 6 is another view showing a collar bearing for a spindle;

FIGURE 7 is a view partly in section and partly broken away, showing a spindle arrangement in which the center part is non-rotatable and the outer part is rotatable.

Figure 1:
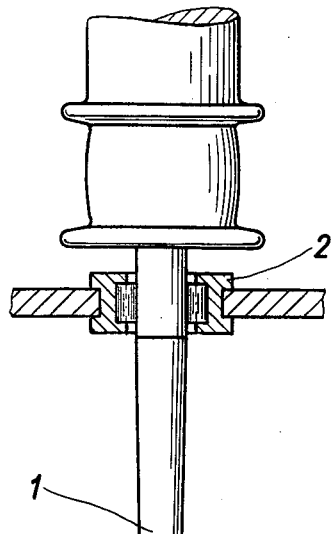
FIGURE 1 is a view partly in section, showing a belt driven spindle.

FIG. 1 shows a belt-driven spindle. The shank 1 of the spindle is mounted at a region at the top in a fixed roller bearing 2 and at a region at the bottom in a slide bearing 3. The slide bearing 3 is seated in the friction disc 4 which is held between the friction disc 5 and the base 6 of the bushing 7 by the pressure of disc 5 and the base 6 of the bushing 7 by the pressure of the spring 8. The external diameter of the friction disc 4 is smaller than the internal diameter of the bushing 7. A lining 9 made of elastic plastics or rubber is provided in the gap to center the shank 1 of the spindle. The friction disc 5 has just sufficient air in the bushing 7 to enable it to move axially, so that the normal pressure of the spring 8 can act without hindrance on the disc 4.

FIG. 2 shows a spindle driven by bevel gears. The gear 10 is mounted on the shank 1 of the spindle and engages the driver 11. The shank 1 is mounted at the bottom in a grooved bearing 12, which is in turn mounted in a tubular bearing housing 13. The collar bearing is here shown as a roller bearing 14 seated in a bush 15 which is guided radially by a plurality of thin friction discs 16. Located between the discs 16 are similar friction discs 17 which are held externally in the tubular bearing housing 13 with close clearance. Resilient centering rings 18 surround the shank 1 to center the shank 1. These discs may be placed in the other gaps 19 or be left therefrom as desired in order to regulate the centering action. The normal pressure on the friction discs 16 and 17 is generated by plate springs or star spring washers 20. In order to prevent rotation, the bush 15 is provided with a pin 21 which engages in the cover plate 22. The discs 16 and 17 have stepped holes 23 so that the lubricant, for example grease, can be favorably distributed. Grooves 16a may be provided in the faces of the discs, as shown in FIGURE 3, to assist in distribution on the lubricant.

Figure 4:
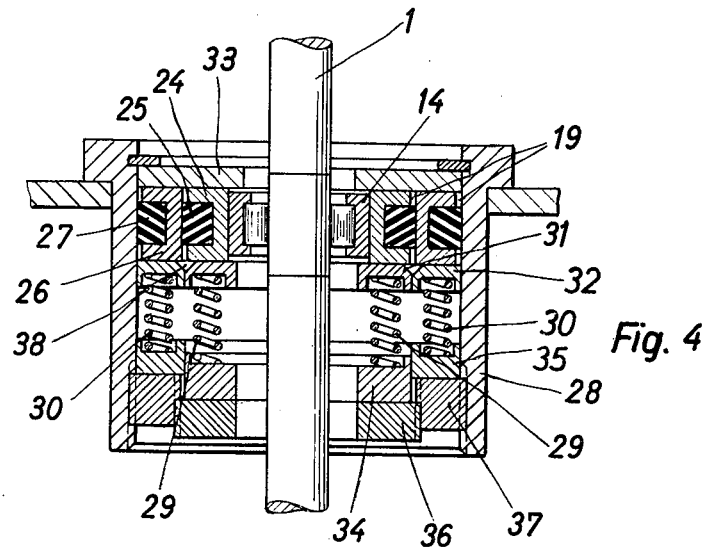
FIGURE 4 is a fragmentary view showing a collar bearing for a spindle.

FIGURE 4 shows the collar bearing of a spindle. The shank 1 of the spindle moves in the roller bearing 14, which is seated in a bush 24 in the form of a friction disc. The bush has a groove into which a centering ring 25 made of resilient material is placed. The centering ring 25 bears on a bush 26 which is designed as a fraction disc and also has a groove accommodating a centering ring 27 which bears against the bush 28.

The bushes 24 and 26 are pressed against the cover plate by the springs 29 and 30 acting through the friction discs 31 and 32. The bushes 24 and 26, friction discs 31 and 32 and cover plate 33 may, for example, be made of steel, hardened and ground. The springs 29 may be weaker than the springs 30, and the Shore hardness of the centering ring 25 is less than that of the centering ring 27. In this way the damping of the oscillations of the shank is divided into two stages. The smaller vibrations are compensated for by the internal damping and centering elements (24, 25, 29, 31) and the larger, more powerful oscillations by the external damping and centering elements (26, 27, 31, 32). The effect may, of course, also be obtained if the arrangement is reversed.

In order that the friction and thus the damping effect can be varied, the force of the springs 29 and 30 is adjustable in this example. The springs 29 and 30 are supported by the rings 34 and 35, respectively, which in turn bear on the nuts 36 and 37 screwed into the bush 28. In order to prevent the bushes 24, 26 from coming into contact with the discs 32, 31, respectively, when they are deflected, the discs 31 and 32 have bevels 38. The two bevels 38 together must be at least as wide as the sum of the gaps 19.

Figure 5:
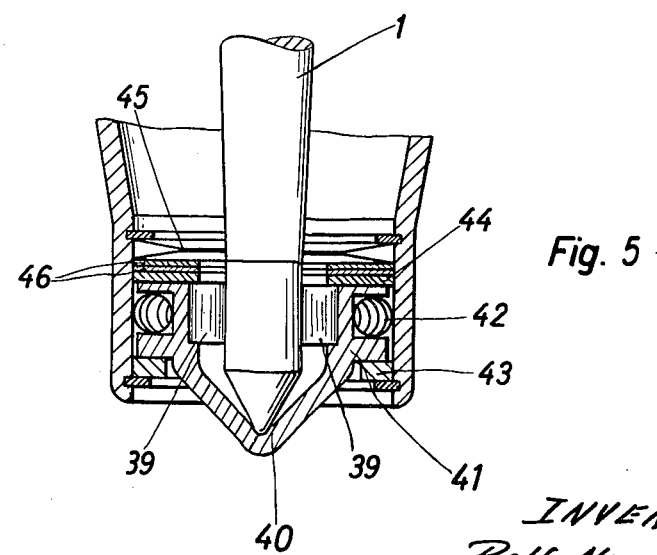
FIGURE 5 is a fragmentary view showing a base bearing for a spindle.

FIG. 5 shows the base bearing of a spinning or yarn spindle. The shank 1 of the spindle is guided radially in rollers 39 and axially downwardly in the pan 40 of the outer ring 41. A helical spring 42 is placed in the groove in the outer ring 41 to act as a centering element. The outer ring 41, in the form of a friction disc, bears on a friction disc 43, and a second friction disc 44 presses onto the outer ring 41 from above. The pressure is generated by plate springs or spring washers 45 and additional pressure arises on the lower contact surface due to the weight of the spindle. As the weight of the cop increases, the frictional effort and thus the damping effect also increase. Above the second friction disc 44 there are two discs 46, which may be fitted if it is desired to vary the spring force and thus the normal pressure.

FIG. 6 shows a collar bearing for a spindle. In this particularly simple construction, the outer ring 47 of the roller bearing for the spindle has been enlarged in its external diameter and provided with a groove to contain the centering element, an undulating annular spring 48. The discs 49 of the roller bearing have also been enlarged in their external diameter and are supported in the bush 50. Small gaps 19 are left between the outer ring 47 and the bush 50 to enable the shank 1 of the spindle to be deflected. Normal pressure is provided by plate or star-type springs 51 arranged below and above the discs 49. In this way the whole bearing can adjust itself slightly relatively to the axis of the spindle. The outer ring 47 is provided with a pin 52 to prevent rotation.

FIG. 7 illustrates a rotary spindle. The shank 1 of the spindle does not rotate. A whorl 53, which may be mounted in ball bearings, rotates on the shank 1 and is provided at the top with toothing 54, the toothing 54 engaging with sufficient clearance in opposed toothing 55 and thus entraining the upper portion 56, so that it can be freely adjusted. The upper portion 56 is held in a ball bearing 57 at the top of the shank 1 and is covered at the top with a removable cap 58. At the bottom, the upper portion 56 moves against rollers 59 which in turn move against an inner ring 60 in the form of a friction disc. Relative radial movement between additional friction discs 61 is made possible by gaps 19 which may, for example, contain centering rings 18. The normal resilient pressure is generated by a resilient annular spring 63 made of rubber or plastics. The normal pressure and thus the damping effect may be varied by turning the nut 64 on the shank 1 of the spindle. It is an advantage to provide a grease lubricant to lubricate the rollers 59 and friction discs 60, 61 and 62. The friction discs 61 have lugs 65 which engage in a groove 66 in the shank 1 in order to prevent rotation.

Figure 8:
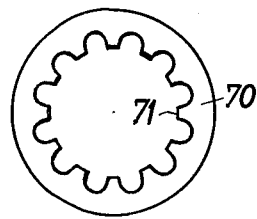
FIGURES 8 through 17 are views showing different constructions of centering elements or rings pertaining to the spindle structure.
Figure 9:

FIGURES 8 and 9 are elevational and sectional views, respectively, of a centering element 70 such as is used at 18 in FIGURE 2 and at 27 in FIGURE 4, for example, and which element or ring is made of resilient material and has internal teeth 71.

Figure 10:
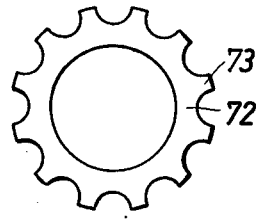
Figure 11:

FIGURES 10 and 11 are views like FIGURES 8 and 9, respectively, showing a similar centering element or ring with external teeth 73.

Figure 12:
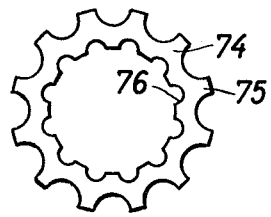
Figure 13:
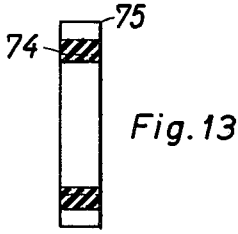

FIGURES 12 and 13 are elevational and sectional views, respectively, of a centering element 74 according to the invention, which is made of resilient material and wherein the external teeth 75 of the ring are positioned opposite the gaps 76 between the internal teeth of the ring.

Figure 14:
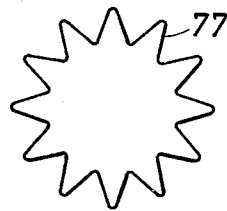
Figure 15:
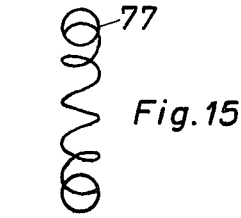

FIGURES 14 and 15 are elevational and sectional views, respectively, of a centering element or ring 77 according to the invention, which is in the form of a coil spring formed into a ring shape.

Figure 16:
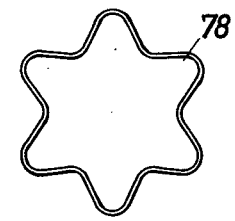
Figure 17:
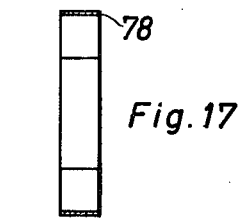

FIGURES 16 and 17 are elevational and sectional views, respectively, of a centering element or ring 78 according to the present invention, which is in the form of a corrugated annular spring.

It will be understood that this invention is susceptible to modification in order to adapt it to different usages and conditions; and accordingly, it is desired to comprehend such modifications within this invention as may fall within the scope of the appended claims.

I claim:

1. In combination; a spinning spindle member, bearings for said spindle member positioned in a pair of axially spaced regions along the spindle member, the said bearings in one of said regions being mounted on said spindle, a housing member surrounding said bearings and supportingly engaging the bearing in said one of said regions, and means in the other of said regions for damping vibration of said members relatively in at least the direction lateral to the axis of the spindle member comprising first friction disc means operatively mounted in said housing member so as to be non-radially moveable therein but axially moveable therein, second friction disc means operatively mounted on said spindle member so as to be non-radially moveable thereon but axially moveable thereon, the said bearing at said other region being operatively interposed between one of said members and the said disc means pertaining thereto, each member being radially spaced from the disc means pertaining to the other member, spring means pressing said disc means axially into engagement with each other to effect frictional interengagement thereof, and radially resilient means disposed in the space between the other of said members and the disc means pertaining to the said one member and yieldably engaging the said other member and the disc means pertaining to said one member and coplanar with the latter to bias said members toward a predetermined relative radial position.

2. The combination according to claim 1 which includes means for adjusting the thrust of said spring means.

3. The combination according to claim 1 which includes means for lubricating said disc means.

4. The combination according to claim 1 in which each friction disc means is a set of a plurality of discs and the discs of one set alternating with those of the other set.

5. The combination according to claim 3 in which said means for lubricating said disc means comprises stepped holes therein.

6. The combination according to claim 3 in which said means for lubricating said disc means comprises groove means in the interengaging faces of the disc means.

7. The combination according to claim 1 in which said resilient means is rubber-like.

8. The combination according to claim 1 in which said resilient means is an undulating spring member.

9. The combination according to claim 1 in which said resilient means is a resilient annular member having radially extending tooth means thereon.

10. The combination according to claim 9 in which said tooth means comprise both external and internal teeth with each tooth on the outside of the member being radially aligned with a tooth space on the inside of the member.

References Cited by the Examiner

UNITED STATES PATENTS

| | | | |
|---|---|---|---|
| 880,383 | 2/1908 | Knudsen | 308—143 |
| 2,606,082 | 8/1952 | Svensjo | 308—143 |

DON A. WAITE, *Primary Examiner.*

FRANK SUSKO, *Examiner.*